United States Patent
Brady

(10) Patent No.: US 12,547,323 B1
(45) Date of Patent: Feb. 10, 2026

(54) SEQUENTIAL RECONSTRUCTION FOR DYNAMIC STRIPE WIDTH RAID

(71) Applicant: VDURA, Inc., San Jose, CA (US)

(72) Inventor: Donald James Brady, Woodland Park, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/277,224

(22) Filed: Jul. 22, 2025

(51) Int. Cl.
*G06F 3/00* (2006.01)
*G06F 3/06* (2006.01)

(52) U.S. Cl.
CPC ............ *G06F 3/0619* (2013.01); *G06F 3/064* (2013.01); *G06F 3/0659* (2013.01); *G06F 3/0689* (2013.01)

(58) Field of Classification Search
None
See application file for complete search history.

(56) References Cited

U.S. PATENT DOCUMENTS

2025/0028602 A1* 1/2025 Sen .................... G06F 16/1734

* cited by examiner

*Primary Examiner* — Midys Rojas
(74) *Attorney, Agent, or Firm* — Fenwick & West LLP

(57) ABSTRACT

A system stores and sequentially reconstruct a set of data. The system divides the set of data into the plurality of blocks and adds, for each block, a block pointer to a zone group index corresponding to a zone group of the block. In response to allocating a final block for a zone group, the system writes the zone group index in a same transaction group as the data in the respective zone group. The system stores a block pointer for the zone group index in a set of zone group metadata. The system sequentially reconstructs the set of data by loading the zone group metadata associated with one or more zone groups of the set of data and iterating, for each of the one or more zone groups, through a respective zone group index. The storage reconstructs each block referenced in a respective zone group index.

20 Claims, 10 Drawing Sheets

300

SEQUENTIAL RECONSTRUCTION FOR DYNAMIC STRIPE WIDTH RAID

BACKGROUND

1. Field of the Disclosure

The present disclosure relates to storage systems and more specifically to sequential reconstruction for dynamic stripe width RAID (redundant array of independent disks).

2. Description of the Related Art

RAID-Z, a data protection scheme used in the Zettabyte File System (ZFS) file system, improves upon traditional RAID-5 by using dynamic stripe widths and variable block sizes to eliminate the write hole and support end-to-end data integrity through checksumming. However, RAID-Z faces a critical limitation known as the disk ordering problem during reconstruction after disk failure. When metadata—such as block pointers or higher-level directory structures—is partially lost or corrupted, RAID-Z can still recover raw data blocks using parity but cannot guarantee their correct logical ordering. This poses a significant challenge for ZFS's integrity model, which relies on checksums stored in parent metadata blocks to verify data correctness. If the logical relationship between data blocks and their associated checksums is disrupted, integrity validation fails, even if the recovered data appears structurally sound. As a result, RAID-Z reconstruction in the absence of complete metadata may yield data that cannot be trusted or validated, undermining one of the core benefits of the ZFS architecture.

SUMMARY

The present disclosure relates to systems and methods for resolving the disk ordering problem of RAID-Z reconstruction while preserving data integrity validation aspect. The systems and methods allow for reconstruction to proceed in disk-order while still verifying checksums.

In some embodiments, the system stores a set of data at a plurality of blocks. In particular, the system divides the set of data into a plurality of blocks. The system adds, for each block, a block pointer to a zone group index corresponding to a zone group of the block. In response to allocating a final block for a zone group, the system writes the zone group index in a same transaction group as the data in the respective zone group. Each zone group is a structured unit of a plurality of blocks, and each transaction group is a batch of operations grouped together and committed atomically (e.g., as a single, indivisible unit) to storage. The system stores a block pointer for the zone group index in a set of zone group metadata. The system performs sequential reconstruction of the set of data by first loading the zone group metadata associated with one or more zone groups of the set of data. The system next iterates, for each of the one or more zone groups, through a respective zone group index and reconstructs each block referenced in a respective zone group index.

The disclosed system provides multiple improvements over conventional techniques. In particular, the system allow reads and writes to occur in large sequential requests, which reduces seek time and improves performance. Further, unlike blind copying in a traditional sequential rebuild, the system maintains checksum validation during reconstruction. Additionally, the block pointer metadata compresses well, which only adds minimal storage cost. Thus, by combining sequential I/O (input/output) ordering with integrity validation, the system significantly reduces the window of vulnerability (e.g., the period during which another disk failure could result in data loss) while maintaining ZFS's robust data protection mechanisms.

BRIEF DESCRIPTION OF THE DRAWINGS

The teachings of the embodiments can be readily understood by considering the following detailed description in conjunction with the accompanying drawings.

Figure 1:
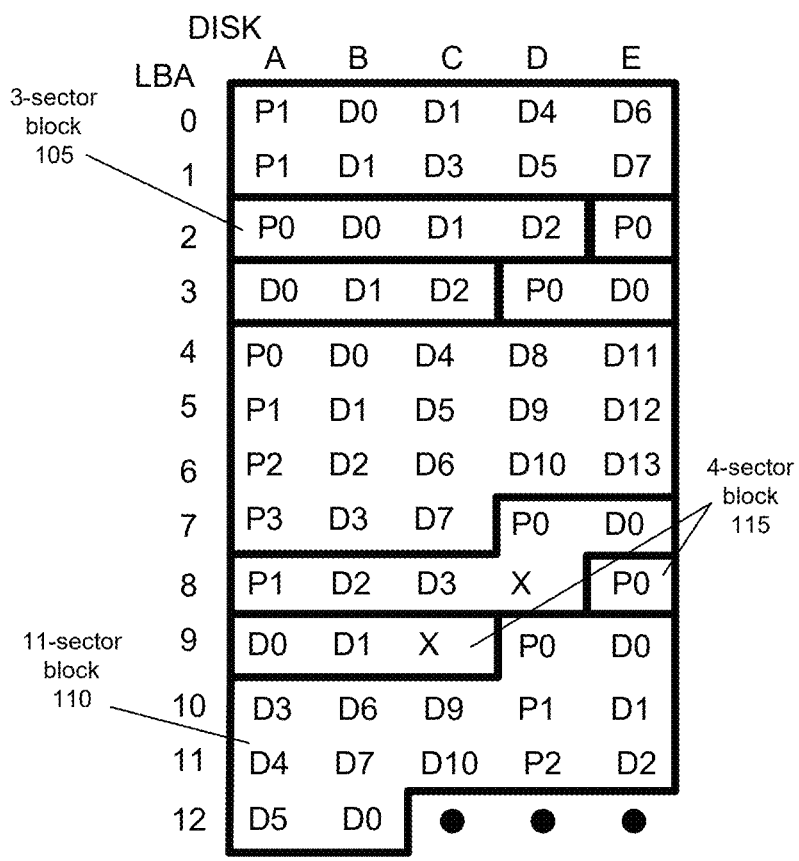
FIG. 1 illustrates an example of a 5-Wide RAIDZ-1, in accordance with one or more embodiments.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

RAID (Redundant Array of Independent Disks) is a data storage virtualization method that aggregates multiple physical disks into one or more logical storage units. This technique enhances both performance and redundancy by distributing data across drives according to different RAID levels, each tailored to specific performance, fault tolerance, and capacity tradeoffs. The core principle behind many RAID levels is the use of parity, a form of error-correcting code that allows missing data to be reconstructed in the event of a disk failure. When a disk fails, parity information may be used to regenerate lost data during read operations. To maintain redundancy, the missing data is rebuilt onto a new replacement disk. The speed at which this reconstruction occurs is critical because it minimizes the "window of vulnerability"—the time during which a second failure could cause irreversible data loss.

Within OpenZFS (e.g., the open-source version of ZFS), a specialized implementation of RAID known as RAID-Z is used. While RAID-Z shares similarities with traditional RAID (e.g., RAID-4, RAID-5, and RAID-6) in its use of parity, RAID-Z introduces a significant architectural improvement: a dynamic stripe width. Unlike conventional RAID-5, which relies on fixed stripe sizes and may suffer from partial writes (known as the "write hole" problem), RAID-Z ensures that each block forms a complete RAID stripe, regardless of its size. This design guarantees that all writes are full-stripe, eliminating the inconsistencies that can arise during power loss or crashes in traditional parity-based systems.

RAID-Z also improves upon traditional RAID during reconstruction. Because of its dynamic structure, RAID-Z cannot rely on fixed geometric assumptions when restoring a failed disk. Instead, RAID-Z must traverse filesystem metadata to determine the structure of each block and its placement. This traversal, however, provides a unique advantage: ZFS validates every block against its built-in 256-bit checksum during the process, ensuring both accurate reconstruction and detection of any latent data corruption. In contrast, conventional RAID systems typically do not perform checksum verification during recovery, making RAID-Z more robust in maintaining data integrity.

RAID-Z differs from traditional RAID configurations by allocating parity at the block level rather than using fixed stripe boundaries. In conventional RAID setups, parity is typically calculated and assigned to a fixed set of disks across uniform stripes. In contrast, RAID-Z dynamically determines parity placement based on the size and alignment of each individual block. This results in greater flexibility and improved handling of variable block sizes, particularly for file systems like ZFS that work with diverse data structures.

FIG. 1 illustrates an example of a 5-Wide RAIDZ-1 100, in accordance with one or more embodiments. The 5-Wide RAIDZ-1 100 is a RAIDZ-1 level in ZFS, consisting of five disks. RAIDZ-1 is similar to RAID 5, providing data redundancy by distributing parity information across all the disks. For example, in the 5-wide RAIDZ-1 100, a 3-sector block 105 consists of three data sectors (e.g., D0, D1, D2) and one parity sector (e.g., P0), occupying part of a single row of disks (e.g., disks A though D). In contrast, an 11-sector block 110 may span multiple rows, with a layout such as one parity and four data sectors (e.g., P0, D0, D3, D6, D9), followed by another parity and four more data sectors (e.g., P1, D1, D4, D7, D10), and finally another parity and three data sectors (e.g., P2, D2, D5, D8). As shown, multiple blocks may share a single stripe, and a stripe may contain multiple parity sectors.

To maintain space efficiency and avoid fragmentation, RAID-Z enforces an allocation rule where each block must consume a multiple of (p+1) sectors, where p is the number of parity sectors for that RAIDZ level. This ensures that when blocks are deallocated, the freed space is large enough to accommodate a new full-sized data block with parity. For instance, a four-sector block 115 requiring one parity (e.g., P0) and two data sectors (e.g., D0, D1) will also include a padding sector (e.g., X) to align properly with this rule.

Compared to traditional RAID, RAID-Z offers more flexible parity distribution and better support for variable-sized data blocks. However, this flexibility comes at a cost: RAID-Z generally incurs slightly higher overhead due to the additional metadata and alignment padding required to manage dynamic block-based parity.

RAID-Z reconstruction in ZFS is a complex process necessitated by disk failure within a RAID group. Unlike traditional RAID systems that rely on fixed stripe widths, RAID-Z uses variable stripe widths, storing all data layout information in metadata-specifically in block pointers organized within a Merkle tree. Each node in this structure contains checksums of its child nodes, with the integrity of the entire system verifiable up to the top-level uber block. While this design ensures robust data integrity, it complicates the reconstruction process, as data must be retrieved by traversing the block tree rather than by accessing blocks in disk order.

The situation is further complicated by ZFS's copy-on-write (COW) behavior. As blocks are never overwritten in place, their locations on disk change over time, resulting in highly randomized I/O patterns. During reconstruction, surviving data must be read from scattered disk locations and written to a replacement disk in similarly fragmented sequences. This random I/O significantly slows the reconstruction process and increases system load.

The storage system described herein addresses a long-standing challenge in RAID-Z reconstruction: the conflict between preserving disk-order I/O and maintaining data integrity through checksum validation. As described above, traditional RAID-Z reconstruction must follow a block tree traversal to verify data integrity, resulting in highly non-sequential and inefficient I/O. The storage system resolves this by enabling reconstruction to proceed in disk order while still verifying checksums, combining performance and reliability.

Use of this storage system introduces supplemental metadata during block allocation. For each allocation region, additional metadata is stored to support reconstruction without needing to traverse the Merkle tree in real time. This allows block pointers to be consulted without abandoning disk-order I/O. Second, the storage system takes advantage of a sequential block allocator, which ensures that new blocks are written in a predictable, sequential layout.

This organization aligns with the goal of reducing I/O randomness during reconstruction. Third, the storage system leverages sequential writing of the new metadata, committing all supplemental metadata for a region at once. This approach limits metadata churn and is especially beneficial in a copy-on-write (COW) file system like ZFS, where metadata consistency and performance must be carefully balanced.

The methods and processes used by the storage system bring several significant advantages over traditional reconstruction methods and processes. First, reconstruction becomes much faster, as data can be read and written in large, contiguous operations, reducing disk seek times and I/O latency. Second, checksum validation is retained, differentiating these methods and processes from traditional sequential rebuilds that blindly copy data without verifying its correctness. Lastly, the methods and processes incur minimal overhead—the supplemental metadata compresses efficiently and imposes only a small increase in storage footprint.

By combining sequential access patterns with robust data integrity checks, the storage system narrows the reconstruction window of vulnerability and preserves the reliability guarantees that are core to ZFS. The storage system thus balances between performance and protection, offering a notable improvement over existing RAID-Z reconstruction methods.

Though the description herein pertains to ZFS, ZFS is described as an exemplary file system and the techniques disclosed may apply to other file systems that perform reconstruction and checksum validation.

Example Storage System

Figure 2:
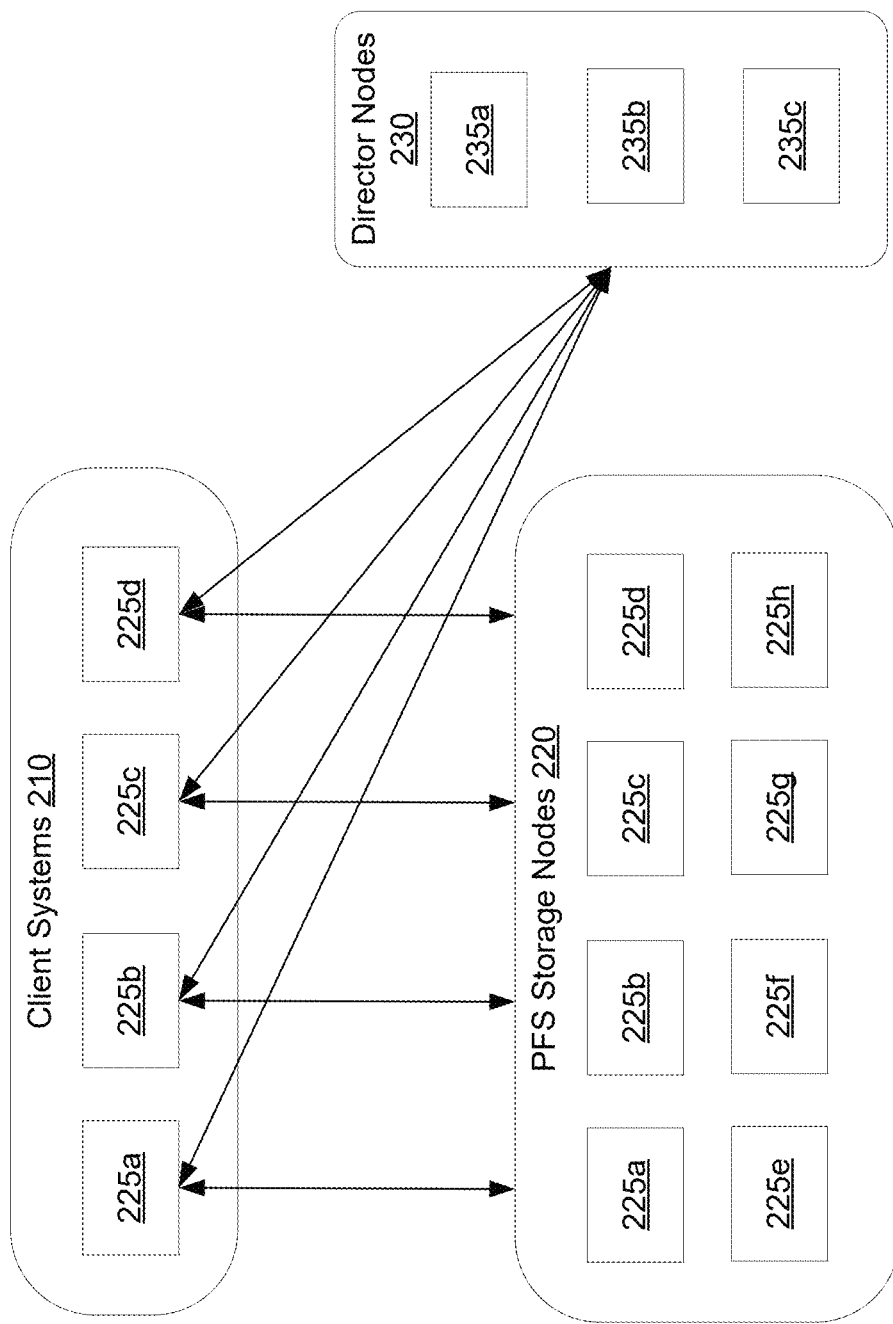
FIG. 2 illustrates the various components in the system environment of a storage system, according to an embodiment.

FIG. 2 illustrates the various components in the system environment of a storage system 205, according to an embodiment. The system environment of the storage system includes a set 210 of client systems 215a, 215b, 215c, 215d, a set 220 or storage nodes 225a, 225b, 225c, 225d, 225e, 225f, 225g, 225h and a set 230 of director nodes 235a, 235b, 235c. The director nodes 235 and storage nodes 225 are computer systems that run the storage system. A client system 215 includes a client driver that is a loadable software module that interacts with the director nodes and storage nodes to read and write the files stored by the storage system. Any required administration is performed via a graphical user interface (GUI) or call level interface (CLI) running on a director node 235. All the director nodes and storage nodes work together to provide a single file system namespace referred to as a realm.

According to an embodiment, the storage system separates the control plane from the data plane. The director nodes 235 in the storage system form the control plane. The director nodes 235 perform various tasks including caching and modifying file system metadata (e.g., directories, file attributes, access permissions, etc.), coordinating the actions of the storage nodes 225 and the client drivers for file accesses, managing membership status of director and storage nodes within the storage system storage cluster, and controlling all failure recovery and data reliability operations. According to an embodiment, director nodes 235 are commodity compute servers with a high-speed networking connection, significant DRAM capacity, and a persistent store for transaction logs.

Storage nodes in the storage system form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant (Portable Operating System Interface compliant) and cache-coherent file system behavior. Each file stored by the storage system is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The storage system scales out both director nodes 235 and storage nodes 225. For any given configuration of the system, additional director nodes can be added for more metadata processing performance. Similarly additional storage nodes can be added for more capacity or more storage performance.

Figure 3:
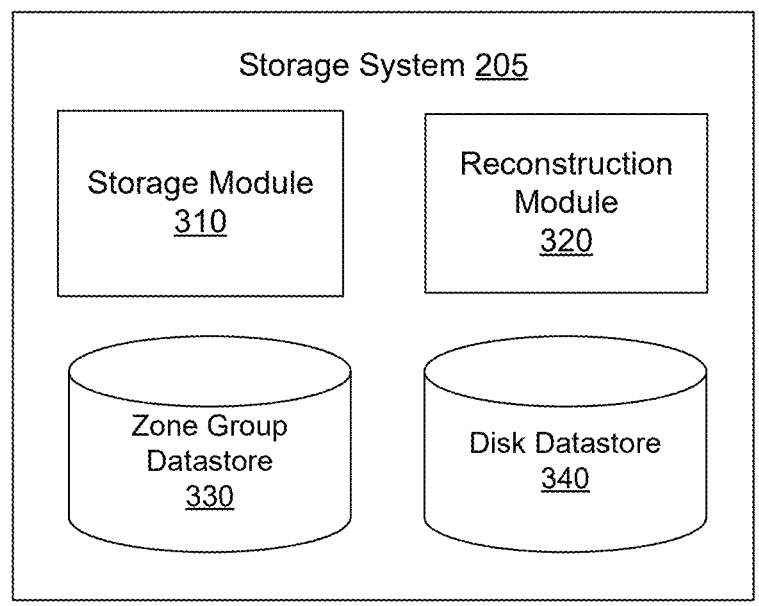
FIG. 3 illustrates a block diagram of the storage system, in accordance with one or more embodiments.

FIG. 3 illustrates a block diagram 300 of the storage system 205, in accordance with one or more embodiments. The storage system 305 includes a storage module 310, reconstruction module 320, zone group datastore 330, and disk datastore 340. In some embodiments, the storage system 305 may include additional or alternative components shown in FIG. 3.

The storage module 310 stores data in blocks. Each block is a unit of stored data on a disk, which may be represented by disk datastore 340. The storage module 310 may receive a set of data from a client system 215 to store. The storage module 310 may select a plurality of blocks to store the data at. To store the set of data at the plurality of blocks, the storage module 310 divides the data into the plurality of blocks. For each block in the plurality, the storage module 310 adds a block pointer to a zone group index corresponding to a zone group of the block. The block pointer is an on-disk data structure used to physically locate, describe, and validate blocks of data on the disk. The zone group index is an identifier linking the respective block to the zone group, where the zone group is a logical grouping of blocks. The set of data may be stored across a plurality of zone groups, such as a first zone group that stores a first subset of the set of data and a second zone group that stores a second subset of the set of data. In some embodiments, the storage module 310 fills the first zone group with the first subset of data before storing the second subset of data at the second zone group. In some embodiments, the zone groups may together form a metaslab, which is a data structure that tracks memory (e.g., storage or disk) allocations and free space in the storage system 305.

In response to allocating a final block for a zone group, the storage module 310 writes the zone group index in a same transaction group as the data in the respective zone group. The storage module 310 stores a block pointer for the zone group index in a set of zone group metadata at the zone group datastore 330. The set of zone group metadata may maintain an array of object identifiers for each zone group index.

The reconstruction module 320 performs sequential reconstruction of sets of data. The reconstruction module 320 may receive a request to view or otherwise access a set of data. The reconstruction module 320 loads the zone group metadata associated with one or more zone groups of the set of data from the zone group datastore 330. For each of the one or more zone groups, the reconstruction module 320 iterates through a respective zone group index. The reconstruction module 320 reconstructs each block referenced in a respective zone group index. For instance, the reconstruction module 320 may read data from surviving disks associated with the set of data and stored in relation to the disk datastore 340. The reconstruction module 320 recalculates missing data using parity and validates checksums of the missing data. The reconstruction module 320 writes the missing data to a replacement disk in the disk datastore 340.

Figure 4:
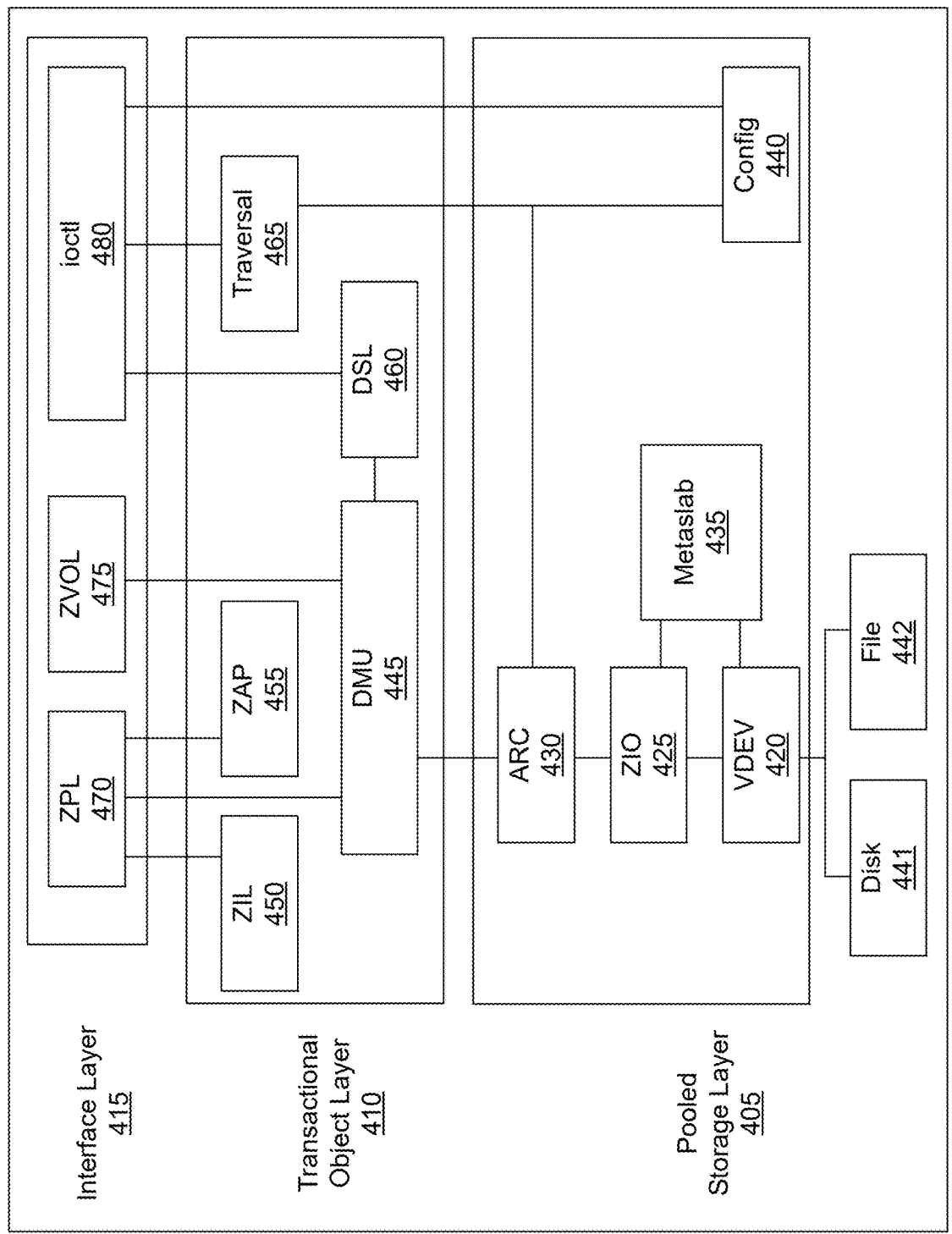
FIG. 4 shows components of OpenZFS kernel module, in accordance with one or more embodiments.

FIG. 4 shows components of OpenZFS kernel module 400, in accordance with one or more embodiments. OpenZFS is an open-source version of the ZFS, and OpenZFS kernel module 400 implements OpenZFS. In some embodiments, the OpenZFS kernel module 400 implements ZFS and may include additional or alternative components shown in FIG. 4. The storage system 305 may operate within or otherwise in relation to the OpenZFS kernel module 400. The OpenZFS kernel module 400 may be organized into three key layers: a pooled storage layer 405, a transactional object layer 410, and an interface layer 415. These layers work together to manage physical storage, enforce data integrity, and present a user-accessible interface for both file and block-level operations.

At the lowest level, the pooled storage layer 405 handles direct interactions with physical storage devices. This includes the VDEV 420 (Virtual Device) system, ZIO 425 (ZFS I/O pipeline), ARC (Adaptive Replacement Cache) 430, metaslab 435, Config (configuration management), disk 441, and file 442. The VDEV 420 abstracts physical disks into logical devices configured for redundancy and performance (e.g., mirrors or RAID-Z). The metaslab 435 may be within the VDEV 420, in some embodiments, and is a contiguous region of disk space used to manage and allocate blocks of data. The ZIO 425 is the core I/O engine that orchestrates operations such as checksumming, compression, and error recovery. The ARC 430 provides a high-speed, in-memory cache for frequently accessed data, reducing disk latency. The Config 440 stores persistent metadata about the storage pool's structure. The disk 441 and file 442 are the storage backend that the VDED 420 uses to form a ZGFS storage pool.

Above the pooled storage layer 405 is the transactional object layer 405, which manages consistency and metadata. The transactional object layer 405 includes a DMU 445 (Data Management Unit), ZIL 450 (ZFS Intent Log), (ZFS Attribute Processor), ZAP 455 (ZFS Attribute Processor), DSL 460 (Dataset and Snapshot Layer), and Traversal 465. The DMU 445 allocates and maintains ZFS objects, including datasets and snapshots. The ZIL 450 supports synchronous writes by temporarily recording operations to ensure crash resilience. The ZAP 455 structures metadata as flexible key-value pairs used for directories and extended attributes. The DSL 460 manages hierarchical datasets and their associated snapshots, while traversal enables scanning of datasets for tasks like backup or scrub operations.

Above the transactional object layer 405 is the interface layer 415, which provides outward-facing functionality used by system and user applications. The interface layer 415 includes a ZPL 470 (ZFS POSIX Layer), ZVol 475, and ioctl 480. The ZPL 470 provides an interface between standard POSIX and OpenZFS, thus allowing OpenZFS to support standard file system operations like reading, writing, and managing files and directories The ZVol emulates block devices, enabling ZFS datasets to appear as raw devices (e.g., for virtual machines). The ioctl is a system call that enables communications with device drivers or kernel subsystems by sending control commands that are not covered by standard system calls like read, write, or open.

Figure 5:
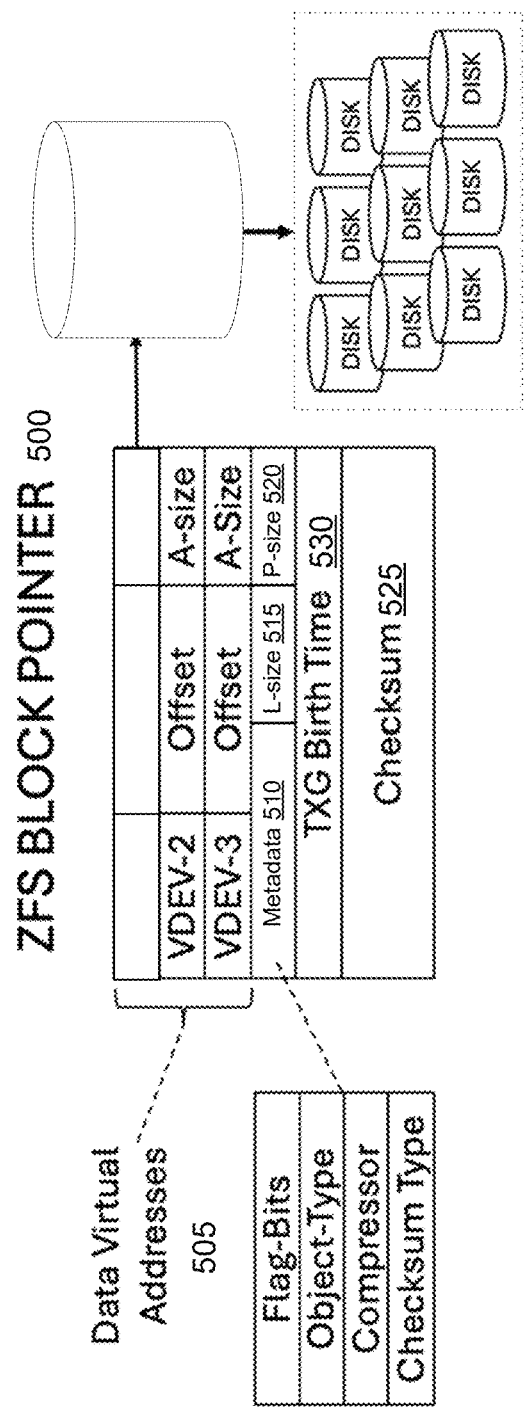
FIG. 5 illustrates an example simplified view of a ZFS block pointer, in accordance with one or more embodiments.

FIG. 5 illustrates an example simplified view of a ZFS block pointer 500, in accordance with one or more embodiments. In some embodiments, the ZFS block pointer 500 (also referred to herein as a block pointer) may include additional or alternative components shown in FIG. 5.

In the example view shown in FIG. 5, the ZFS block pointer 500 is a 128-byte ZFS structure used to physically locate, describe, and validate blocks of data on disk 441. ZFS block pointers 500 may be embedded in any ZFS on disk structure that points directly to other disk blocks, both for data and metadata. The ZFS block pointer contains up to three DVAs 505 (Data Virtual Addresses), metadata 510, logical size 515 (size before compression) and physical size 520 (the nominal size after compression) of the disk block, a TXG (transaction group) that the disk block was created for, and a checksum 525 of the data the ZFS block pointer 500 describes, which may implicitly cover the entire physical size of the data. The DVAs 505 describe where to find the data on a VDEV 420 and the allocated size including RAID-Z parity. The metadata 510 describes what the ZFS block pointer 500 is for and what parts of it mean, including what type of object the ZFS block pointer 500 points to. Besides the layout and checksum information, the TXG birth time 530 may also be used for reconstruction. The TXG birth time 530 helps ZFS determine what blocks were affected during an outage and need to be reconstructed, allowing the storage system 305 to avoid having to rebuild the entire contents of a disk 441 that was down.

Figure 6:
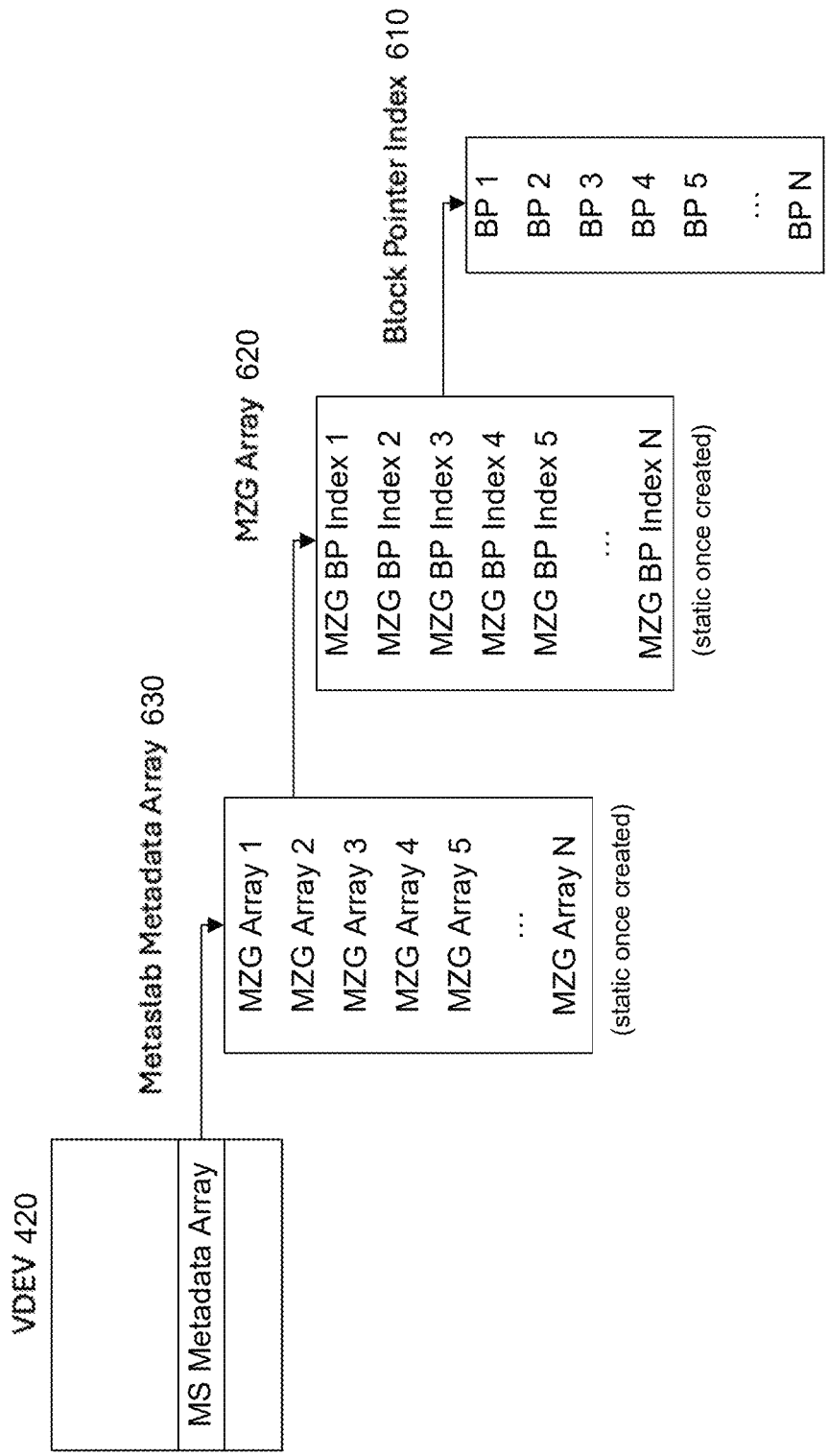
FIG. 6 illustrates an example of a location of a block pointer index, in accordance with one or more embodiments.

FIG. 6 illustrates an example of a location of a block pointer index, in accordance with one or more embodiments. In some embodiments, the process 600 may include additional or alternative components shown in FIG. 6.

A block pointer index 610 contains an array of block pointers. To access a block pointer index 610, the metaslab metadata array 630 must be accessed from a VDEV 420, which is used to access a metaslab zone group (MZG) array 620 of block pointer indices 610. An MZG is an allocation sub-region of a metaslab comprised of a group of zones, where one zone per disk starts at the same logical block address. Each of the metaslab metadata array 630 and the MZG arrays 620 are static once created. Each block pointer index may be stored with each zone group and contain metadata for every block allocated within that zone group. This metadata may be referred to as zone group blocks (ZGB) and enables efficient management and reconstruction of data in RAIDZ configurations. In an example using an 8-wide RAIDZ-2 layout, each zone group contains 2 GB of allocatable space. If all blocks are allocated at the minimum size of 12K (assuming ashift=12), up to 174,763 block pointers would be required. This would result in a worst-case metadata size of 21 MB uncompressed, or approximately 10 MB when compressed-amounting to less than 0.5% storage overhead.

Figure 7:
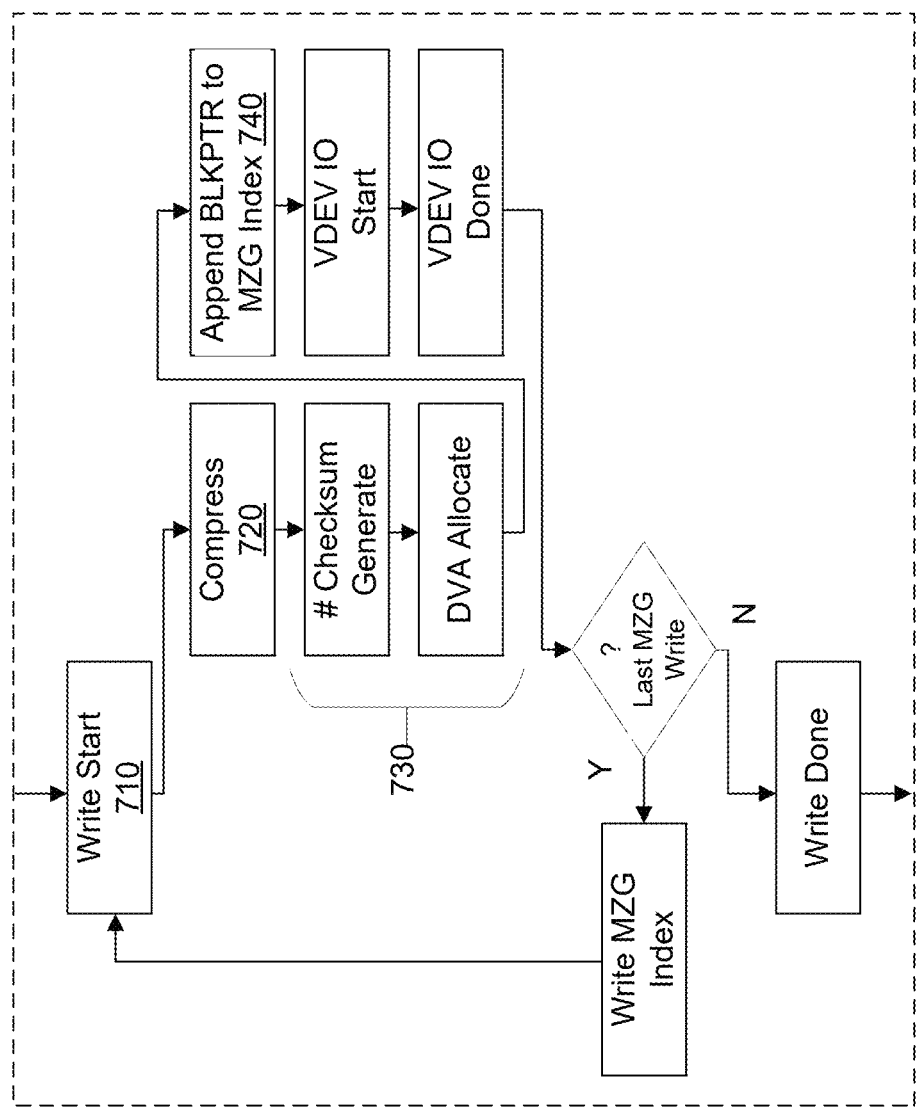
FIG. 7 illustrates an example process of block pointer index generation during a block write, in accordance with one or more embodiments.

FIG. 7 illustrates an example process 700 of block pointer index generation during a block write, in accordance with one or more embodiments. In some embodiments, the process 700 may include additional or alternative components shown in FIG. 7.

Block pointer index generation is the process 700 of creating and maintaining a structured record of block allocations within a defined storage region, such as a zone group. As data is written, the storage system 305 generates block pointers containing metadata such as physical location, block size, checksums, and flags for compression or redundancy. The block pointers are collected and written 710 into an index for a corresponding metaslab zone group e.g., an MZG index-which may be compressed 720 and stored 730 periodically to minimize overhead. MZG indices may also be referred to as MZG arrays, zone group arrays, or zone group indices herein.

Each newly allocated block has its block pointer added 740 to the MZG index for a corresponding MZG. Once the last block for an MZG is allocated, the MZG index is finalized and allocated on disk 441. The MZG index is then written as part of the same transaction group as the MZG's data. Both the MZG data and the MZG index may be atomically written, which ensures consistency. The block pointer for the MZG index may be stored in new metaslab metadata, which maintains an array of object identifiers for each MZG index.

Figure 8:
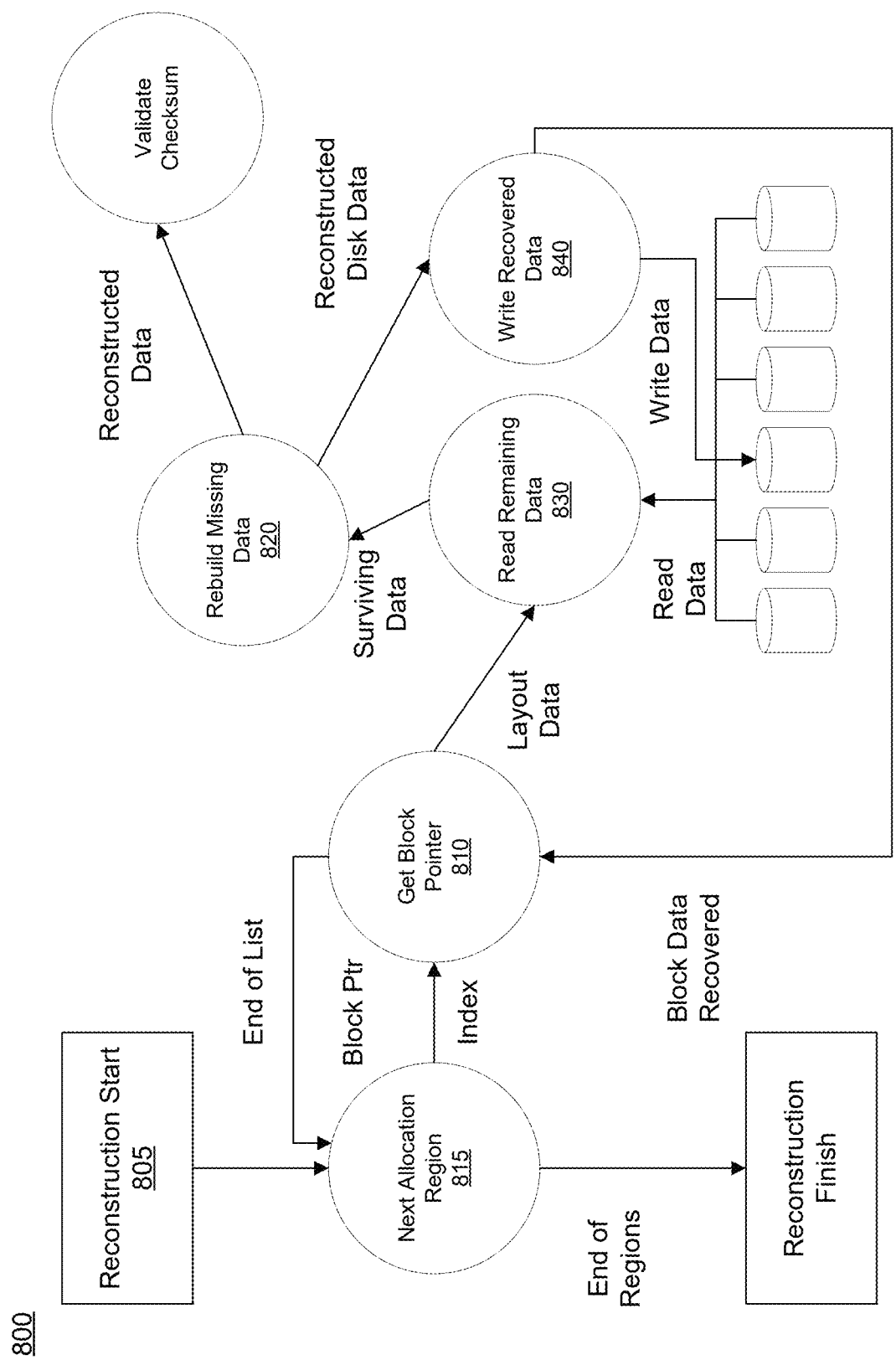
FIG. 8 illustrates an example process for sequential reconstruction, in accordance with one or more embodiments.

FIG. 8 illustrates an example process 800 for sequential reconstruction, in accordance with one or more embodiments. The sequential reconstruction process 800 begins 805 by loading metadata for the MZG indices. For each metaslab 815, the reconstruction module 320 marks the metaslab as unallocatable before iterating over the MZGs of the metaslab. For each MZG, the reconstruction module 22 iterates through the block pointer index and reconstructs each referenced block 820. The reconstruction module 320 may reconstruct each referenced block by reading data from surviving disks 830, recalculating the missing data using parity, validating the checksum to ensure data integrity, and writing 840 the reconstructed data to the replacement disk.

The reconstruction module 320 re-enables allocations for the metaslab. The reconstruction module 320 may perform this process 800 in parallel with other processes or another version of the process 800. The write bandwidth of a replacement disk may be the primary limiting factor for scalability of sequential reconstruction.

In the sequential allocation, the storage module 310 divides a traditional metaslab is divided into multiple zone groups. While the exact size of a zone group is not critical, it is typically around 100 megabytes for a 16-gigabyte metaslab. Each allocation is confined within a single zone group-no allocation spans a zone group boundary. The allocation process used by the storage module 310 may follows a roving first-fit approach, filling a zone group before moving to the next.

Example Method for Region-Based Log Management for Flash Memory

Figure 9:
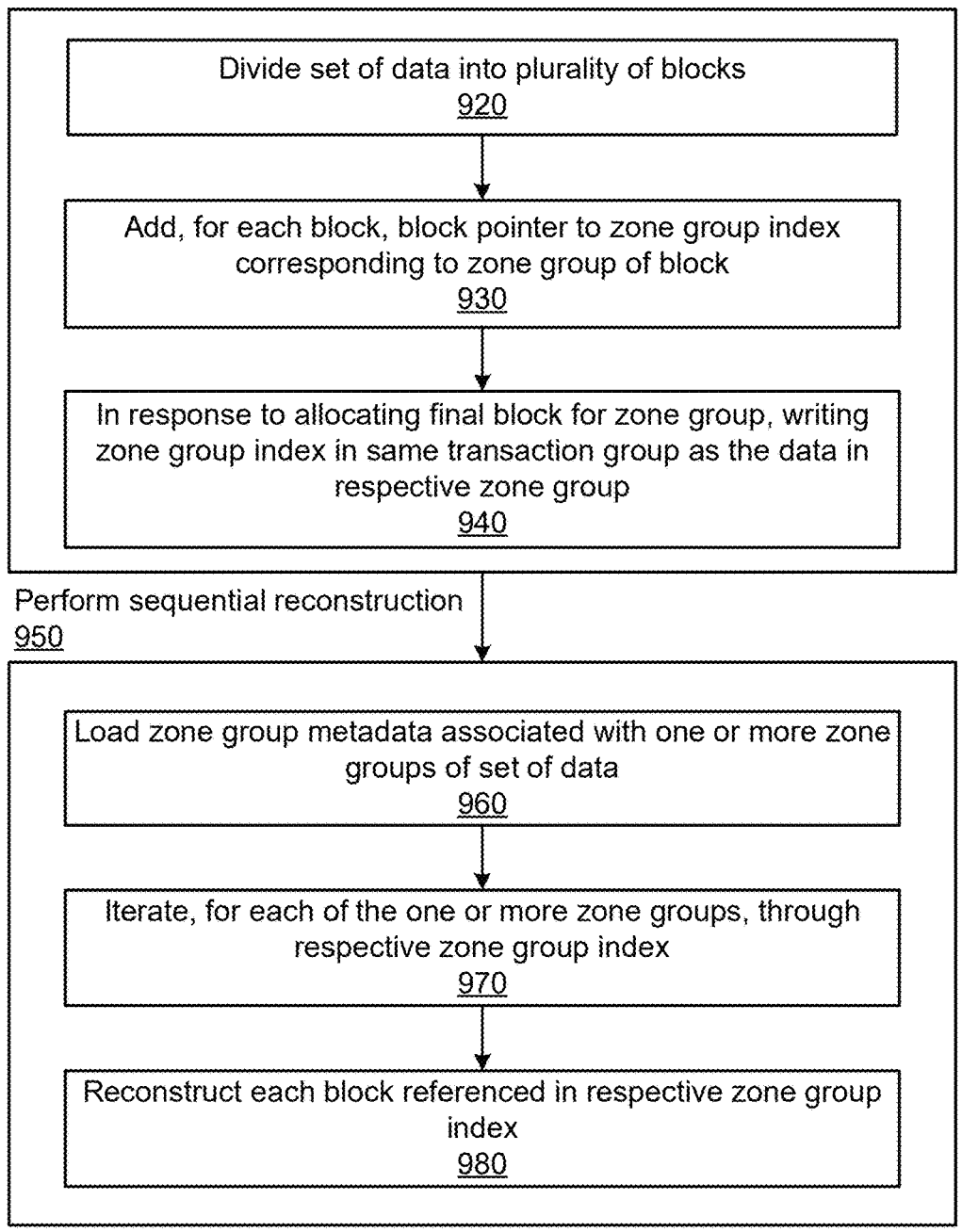
FIG. 9 is a flowchart illustrating an example method for performing sequential reconstruction of a set of data, in accordance with one or more embodiments.

FIG. 9 is a flowchart illustrating an example method 900 for performing sequential reconstruction of a set of data, in accordance with one or more embodiments. The steps in the method 900 may be performed in any sequence. In some embodiments, more or fewer steps may be included in the method 900. The method 900 may be performed by a computing system, e.g., a storage system 205 or a storage node 120, described herein with respect to FIGS. 1-9.

The storage system 205 stores 910 a set of data at a plurality of blocks. In particular, the storage system 205 divides 920 the set of data into the plurality of blocks and adds 930, for each block, a block pointer to a zone group index corresponding to a zone group of the block. In response to allocating a final block for a zone group, the storage system 205 writes 940 the zone group index in a same transaction group as the data in the respective zone group. The zone group is a structured unit of a plurality of blocks, and the transaction group is a batch of operations grouped together and committed atomically to storage. The storage system 205 stores a block pointer for the zone group index in a set of zone group metadata.

The storage system 205 performs 950 sequential reconstruction of the set of data. In particular. The storage system 205 loads 960 the zone group metadata associated with one or more zone groups of the set of data and iterates 970, for each of the one or more zone groups, through a respective zone group index. The storage system 205 reconstructs 980 each block referenced in a respective zone group index.

Example Computer System

Figure 10:
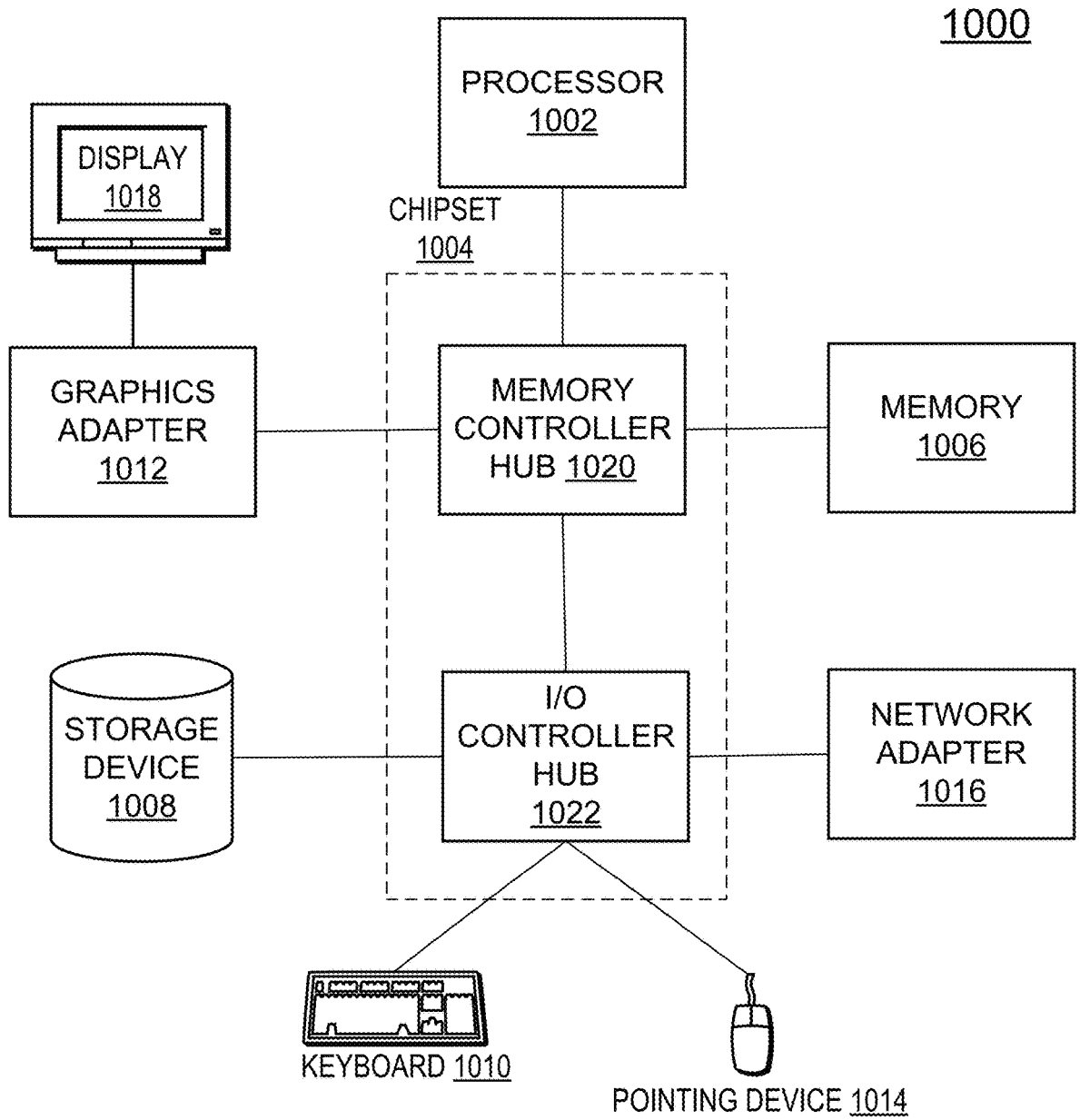
FIG. 10 is a block diagram illustrating components of an example machine able to read instructions from a machine-readable medium and execute them in a processor (or controller), in accordance with one or more embodiments.

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which program code (e.g., software) for causing the machine to perform any one or more of the methodologies discussed herein may be executed. The program code may be comprised of instructions 1024 executable by one or more processors 1002. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processors 1002 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 1004, and a static memory 1006, which are configured to communicate with each other via a bus 1008. The computer system 1000 may further include visual display interface 1010. The visual interface may include a software driver that enables (or provide) user interfaces to render on a screen either directly or indirectly. The visual interface 1010 may interface with a touch enabled screen. The computer system 1000 may also include input devices 1012 (e.g., a keyboard a mouse), a cursor control device 1014, a storage unit 1016, a signal generation device 1018 (e.g., a microphone and/or speaker), and a network interface device 1020, which also are configured to communicate via the bus 1008. The network interface device 1020 enables the system 1000 to communicate with other devices via a network 1026.

The storage unit 1016 includes a machine-readable medium 1022 (e.g., magnetic disk or solid-state memory) on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method comprising:
    storing a set of data at a plurality of blocks, wherein the set of data is stored by:
        dividing the set of data into the plurality of blocks;
        adding, for each block, a block pointer to a zone group index corresponding to a zone group of the block;
        in response to allocating a final block for a zone group, writing the zone group index in a same transaction group as the data in the respective zone group, wherein the zone group is a structured unit of a plurality of blocks and the transaction group is a batch of operations grouped together and committed atomically to storage; and
        storing a block pointer for the zone group index in a set of zone group metadata; and
    performing sequential reconstruction of the set of data by:
        loading the zone group metadata associated with one or more zone groups of the set of data;
        iterating, for each of the one or more zone groups, through a respective zone group index; and
        reconstructing each block referenced in a respective zone group index.

2. The computer-implemented method of claim 1, wherein reconstructing each block referenced in a respective zone group index comprises:
    reading data from surviving disks associated with the set of data;
    recalculating missing data using parity;
    validating checksums of the missing data; and
    writing the missing data to a replacement disk.

3. The computer-implemented method of claim 1, wherein each block forms its own stripe, regardless of block size.

4. The computer-implemented method of claim 1, wherein the set of zone group metadata maintains an array of object identifiers for each zone group index.

5. The computer-implemented method of claim 1, wherein the set of data is stored across a plurality of zone groups.

6. The computer-implemented method of claim 5, wherein the plurality of zone groups includes at least a first zone group and a second zone group, a first subset of the set of data stored at a first zone group and a second subset of the set of data stored at a second zone group, the first zone group filled with the first subset of data before storing the second subset of data at the second zone group.

7. The computer-implemented method of claim 5, wherein the plurality of zone groups together form a metaslab.

8. A non-transitory computer-readable storage medium storing instructions that when executed by one or more computer processors, cause the one or more computer processors to perform steps comprising:
    storing a set of data at a plurality of blocks, wherein the set of data is stored by:
        dividing the set of data into the plurality of blocks;
        adding, for each block, a block pointer to a zone group index corresponding to a zone group of the block;
        in response to allocating a final block for a zone group, writing the zone group index in a same transaction group as the data in the respective zone group, wherein the zone group is a structured unit of a plurality of blocks and the transaction group is a batch of operations grouped together and committed atomically to storage; and
        storing a block pointer for the zone group index in a set of zone group metadata; and
    performing sequential reconstruction of the set of data by:
        loading the zone group metadata associated with one or more zone groups of the set of data;
        iterating, for each of the one or more zone groups, through a respective zone group index; and
        reconstructing each block referenced in a respective zone group index.

9. The non-transitory computer-readable storage medium of claim 8, wherein reconstructing each block referenced in a respective zone group index comprises:
    reading data from surviving disks associated with the set of data;
    recalculating missing data using parity;
    validating checksums of the missing data; and
    writing the missing data to a replacement disk.

10. The non-transitory computer-readable storage medium of claim 8, wherein each block forms its own stripe, regardless of block size.

11. The non-transitory computer-readable storage medium of claim 8, wherein the set of zone group metadata maintains an array of object identifiers for each zone group index.

12. The non-transitory computer-readable storage medium of claim 8, wherein the set of data is stored across a plurality of zone groups.

13. The non-transitory computer-readable storage medium of claim 12, wherein the plurality of zone groups includes at least a first zone group and a second zone group, a first subset of the set of data stored at a first zone group and a second subset of the set of data stored at a second zone group, the first zone group filled with the first subset of data before storing the second subset of data at the second zone group.

14. The non-transitory computer-readable storage medium of claim 12, wherein the plurality of zone groups together form a metaslab.

15. A computing system comprising:
    one or more computer processors; and
    a non-transitory computer readable storage medium storing instructions that when executed by the one or more computer processors, cause the one or more computer processors to perform steps comprising:
        storing a set of data at a plurality of blocks, wherein the set of data is stored by:
            dividing the set of data into the plurality of blocks;

adding, for each block, a block pointer to a zone group index corresponding to a zone group of the block;

in response to allocating a final block for a zone group, writing the zone group index in a same transaction group as the data in the respective zone group, wherein the zone group is a structured unit of a plurality of blocks and the transaction group is a batch of operations grouped together and committed atomically to storage; and storing a block pointer for the zone group index in a set of zone group metadata; and performing sequential reconstruction of the set of data by:

loading the zone group metadata associated with one or more zone groups of the set of data;

iterating, for each of the one or more zone groups, through a respective zone group index; and reconstructing each block referenced in a respective zone group index.

16. The computing system of claim 15, wherein reconstructing each block referenced in a respective zone group index comprises:

reading data from surviving disks associated with the set of data;

recalculating missing data using parity;

validating checksums of the missing data; and writing the missing data to a replacement disk.

17. The computing system of claim 15, wherein each block forms its own stripe, regardless of block size.

18. The computing system of claim 15, wherein the set of zone group metadata maintains an array of object identifiers for each zone group index.

19. The computing system of claim 15, wherein the set of data is stored across a plurality of zone groups.

20. The computing system of claim 19, wherein the plurality of zone groups includes at least a first zone group and a second zone group, a first subset of the set of data stored at a first zone group and a second subset of the set of data stored at a second zone group, the first zone group filled with the first subset of data before storing the second subset of data at the second zone group.

* * * * *